United States Patent [19]

Yan

[11] 4,217,042
[45] Aug. 12, 1980

[54] CAMERA FOR DIFFERENT SPEED FILMS

[75] Inventor: Chan K. Yan, Hong Kong, Hong Kong

[73] Assignee: W. Haking Enterprises Ltd., Hong Kong, Hong Kong

[21] Appl. No.: 937,433

[22] Filed: Aug. 21, 1978

[51] Int. Cl.² .......................... G03B 7/00; G03B 7/18; G03B 9/04; G03B 17/18
[52] U.S. Cl. .................................. 354/21; 352/78 C; 354/273
[58] Field of Search .................. 354/21, 37, 40–42, 354/58, 59, 270, 273, 274, 275; 352/78 C

[56] References Cited

U.S. PATENT DOCUMENTS

| 3,125,939 | 3/1964 | Bundschuh et al. | 354/21 |
| 4,096,490 | 6/1978 | Fujita | 354/21 |
| 4,121,230 | 10/1978 | Ohmura et al. | 354/21 |

*Primary Examiner*—L. T. Hix
*Assistant Examiner*—Shelley Wade

*Attorney, Agent, or Firm*—Wallenstein, Spangenberg, Hattis & Strampel

[57] ABSTRACT

A camera for receiving a cartridge containing relatively high or low speed films has an adjustable aperture mechanism for regulating the amount of light exposing the film, and a manual control mechanism operatively associated therewith and movable between "sunny", "cloudy" and "flash" settings to provide respectively "small", "intermediate" and "large" apertures for high speed film. The cartridge includes structural means thereon of a predetermined configuration in accordance with the speed of the film contained therein. An automatic control mechanism operatively associated with the adjustable aperture mechanism senses the structural means on the cartridge to increase the "small" aperture to the "intermediate" aperture and the "intermediate" aperture to the "large" aperture for low speed film without changing the settings of the manual control mechanism.

20 Claims, 8 Drawing Figures

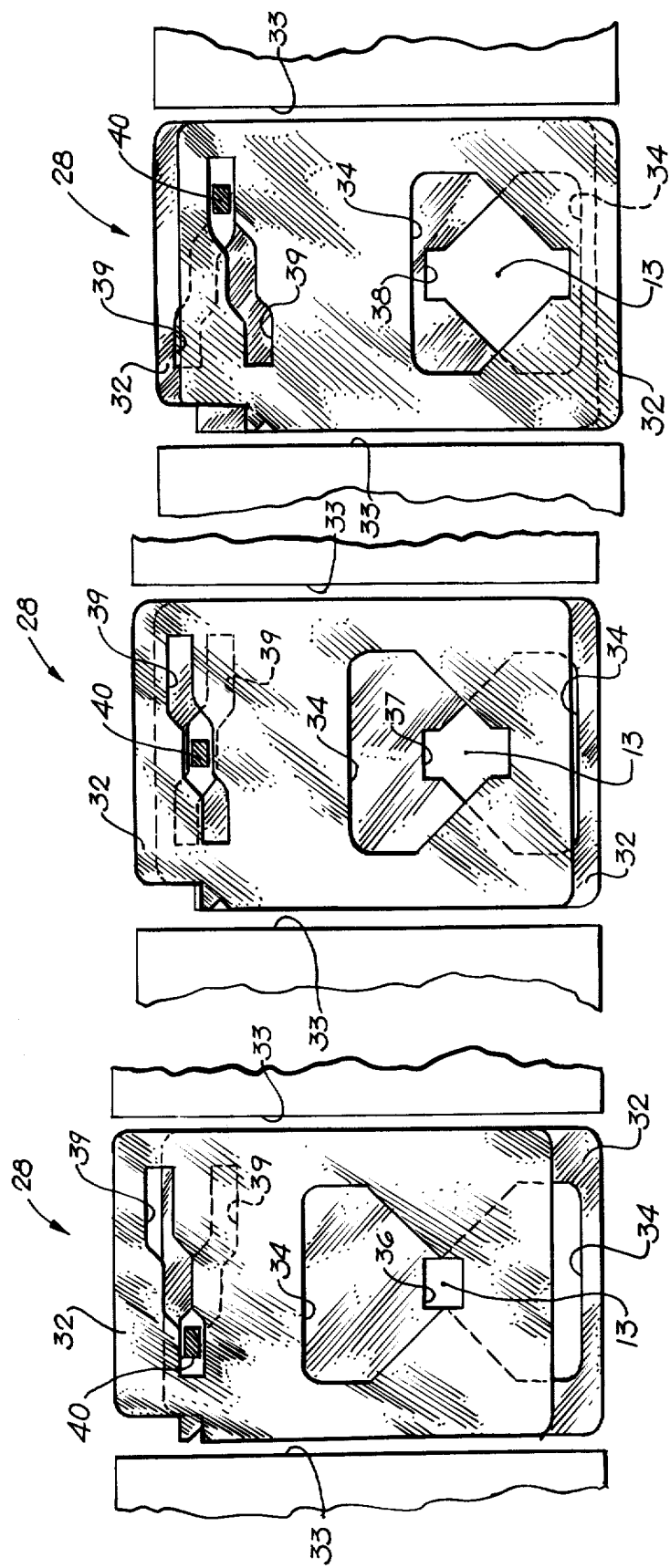

CAMERA FOR DIFFERENT SPEED FILMS

This invention has to do with cameras and more particularly to the inexpensive type camera having a fixed focus and a fixed shutter speed and means for removably receiving a cartridge containing therein a photographic film to be exposed in the camera. The camera of this invention also preferably includes an adjustable aperture mechanism and a manual control mechanism operatively associated therewith and movable between "sunny", "cloudy" and "flash" settings to provide appropriate apertures for exposing the film in the camera. Because of the introduction of high speed films (as for example, ASA 400 film) as compared with low speed films (as for example, ASA 100 film), over exposure of the high speed film, by using a camera designed for the low speed film, would occur.

The principal object of this invention is to provide such a camera which is usable with both such high speed film and low speed film and is automatically convertible from one to the other.

In accordance with the preferred form of this invention, the camera is essentially designed for the high speed film wherein the "sunny", "cloudy" and "flash" settings of the manual control mechanism in cooperation with the adjustable aperture mechanism provide respectively "small", "intermediate" and "large" apertures for the appropriate exposure of the high speed film in the cartridge. In addition, the camera of this invention can also be utilized for approximately exposing low speed film in the cartridge.

In this latter respect, the cartridge includes structural means thereon of a predetermined configuration in accordance with the speed of the film contained therein. An automatic control mechanism in the camera operatively associated with the adjustable aperture mechanism and including a sensing member cooperating with the structural means on the cartridge adjusts the adjustable aperture mechanism to increase the "small" aperture to the "intermediate" aperture and the "intermediate" aperture to the "large" aperture for low speed film without changing the settings of the manual control mechanism. In other words, the apertures for the high speed film are automatically enlarged for appropriate exposure of the low speed film in the same camera.

Briefly, in accordance with this invention and more specifically, the manual control mechanism may include a longitudinally movable member moved in accordance with the "sunny", "cloudy" and "flash" settings thereof and a pivot pin thereon, and the automatic control mechanism may include a longitudinally movable member moved by the sensing member in accordance with the structural means on the film cartridge and a pivot pin thereon. The adjustable aperture mechanism may include a link connected to the pivot pins on said longitudinal movable members and positioned in accordance with the respective longitudinal positions thereof. The adjustable aperture mechanism may also include a pair of relatively movable overlapping apertured plates, the relative positions of which determine the size of the aperture therethrough, having reversely stepped slots therein for receiving the link to relatively position the apertured plates in accordance with the positions of the link.

With respect to another aspect of this invention, the "cloudy" setting of the manual control mechanism may be omitted and only the size of the "small" aperture in the adjustable aperture mechanism would be increased by the automatic control mechanism for low speed film. In accordance with a further aspect of this invention, the feature of the manual control mechanism movable between the "sunny", "cloudy" and "flash" settings may be omitted so that the adjustable aperture mechanism would be controlled only by the automatic control mechanism operatively associated therewith. Here, the adjustable aperture mechanism would provide a small aperture for the high speed film, and the automatic control mechanism including the sensing member cooperating with the structural means on the cartridge would increase the size of the aperture for the low speed film. In this respect the adjustable aperture mechanism, including the link and overlapping apertured plates, and the automatic control mechanism, including the sensing member and the longitudinally movable member with the pivot pin thereon connected to the link, would be the same as discussed above, and the link would also be connected to a stationary pivot pin rather than to the pivot pin on the longitudinally movable member of the manual control mechanism which would not be utilized.

Further objects of this invention reside in the details of construction of the camera and in the cooperative relationships between the component parts thereof.

Other objects and advantages of this invention will become apparent to those skilled in the art upon reference to the accompanying specification, claims and drawings in which:

FIGS. 6A, 6B and 6C are enlarged elevational views of the relatively movable overlapping apertured plates of the adjustable aperture mechanism illustrating, respectively, the plates in their three different aperture positions.

Figure 1:
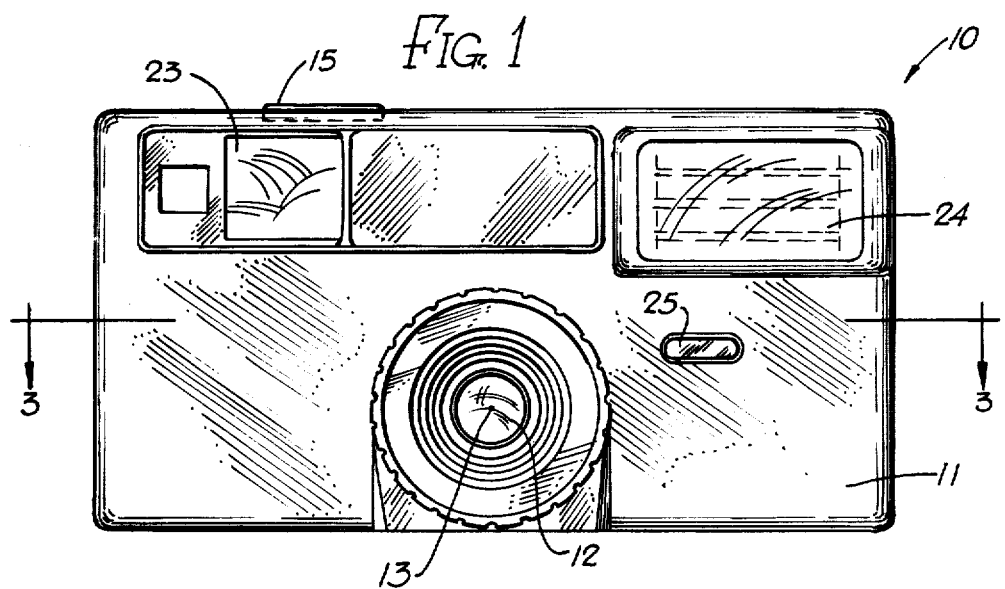
FIG. 1 is a front elevational view of the camera of this invention.

Referring to the drawings, a preferred form of the camera of this invention is generally designated at 10. It includes a camera frame 11 for carrying the various parts of the camera. The front face of the camera is provided with a lens 12 for receiving scene light and directing it along a picture-taking axis 13 for exposing the camera film. A shutter mechanism 14 in alignment with the picture-taking axis 13 operates when open to expose the film. The shutter is operated by a button 15 on the top of the camera by suitable mechanism not illustrated. The camera herein illustrated is of the inexpensive type and preferably has a fixed focus and a fixed shutter speed.

Figure 3:
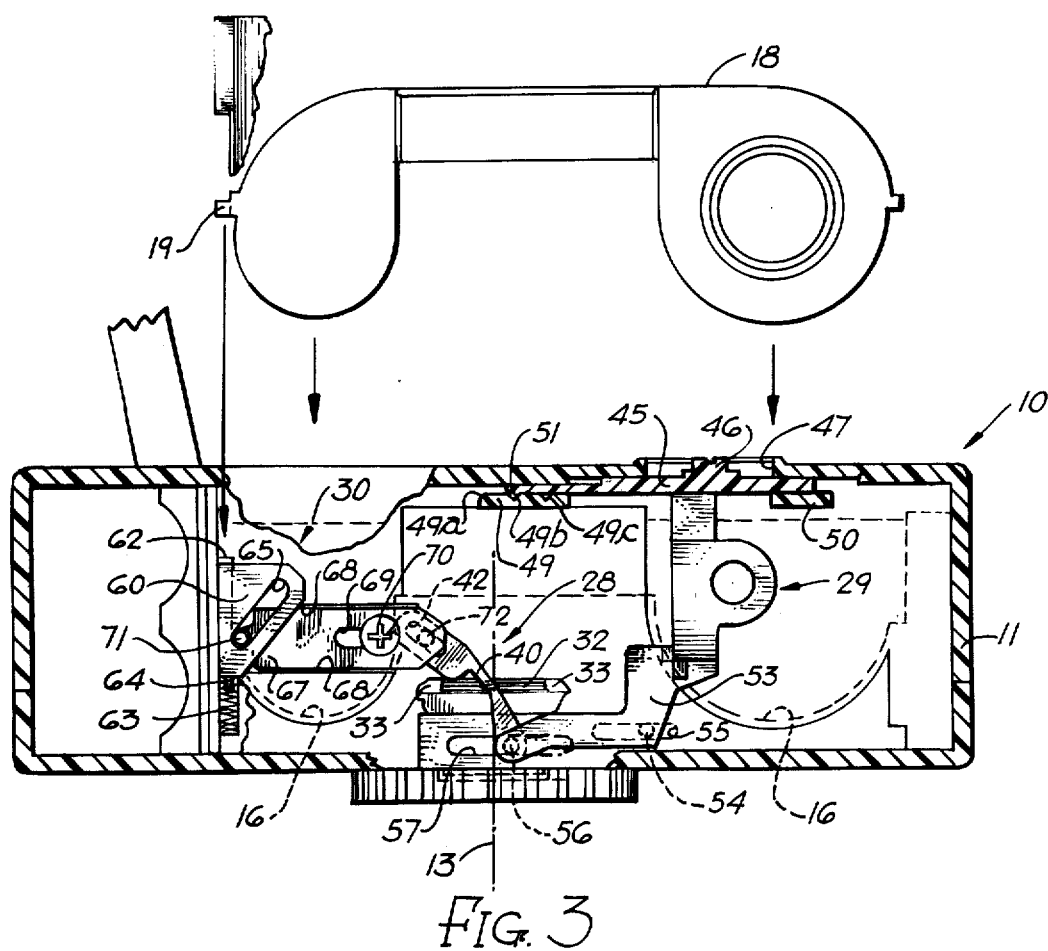
FIG. 3 is a horizontal sectional view taken substantially along the line 3—3 of FIG. 1 and showing a portion of the mechanism in the bottom part of the camera and with the camera set for "cloudy" conditions as in FIG. 2 and a film cartridge to be secured therein.
Figure 4:
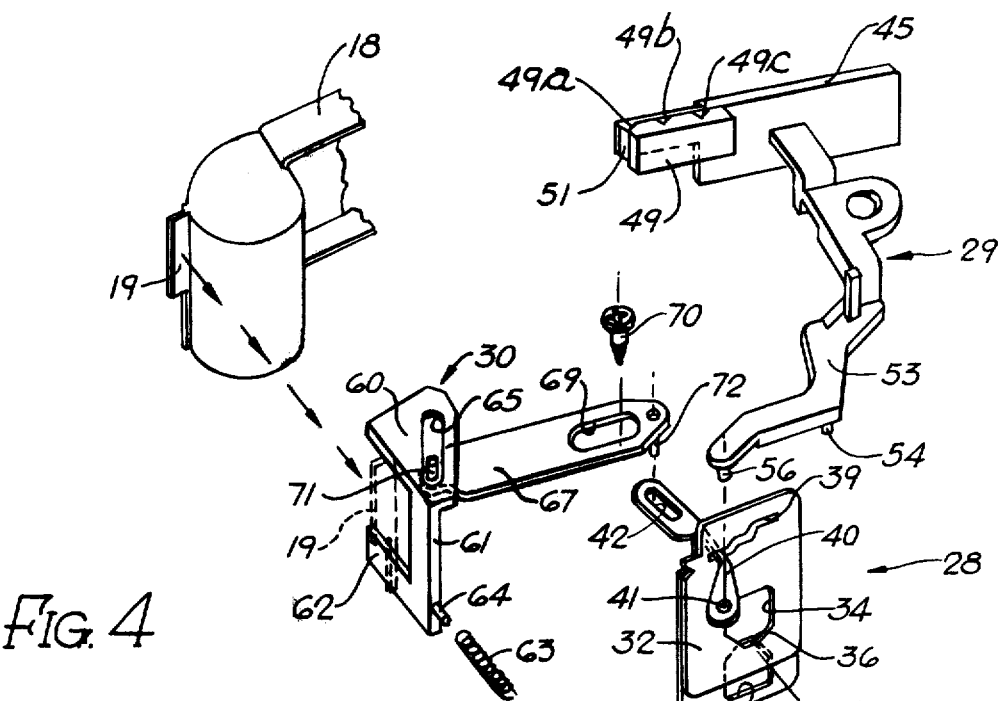
FIG. 4 is an exploded perspective view of a portion of the camera of FIGS. 1 to 3 and showing the camera set for "sunny" conditions and receiving a cartridge containing high speed film.
Figure 5:
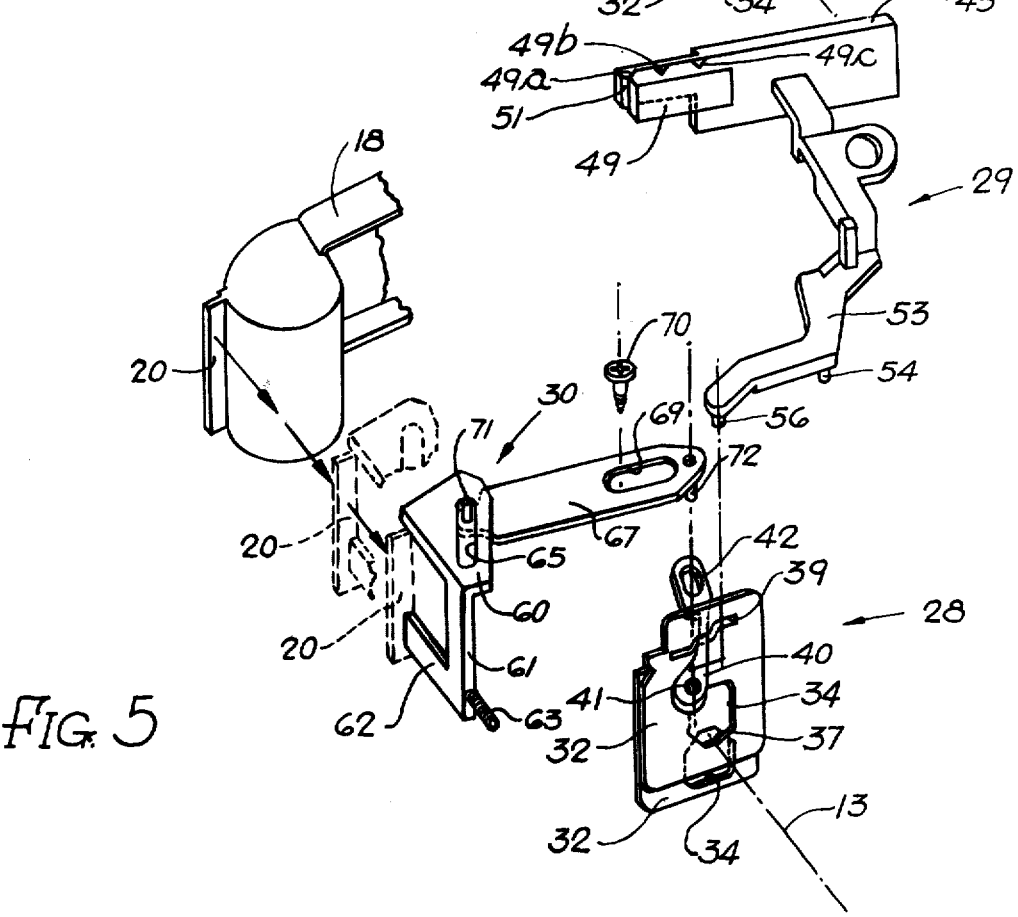
FIG. 5 is an exploded perspective view similar to FIG. 4 also set for "sunny" conditions and receiving a cartridge containing low speed film.

The rear side of the camera has means 16 which is exposed upon opening a door 17 for receiving a cartridge 18 of conventional construction containing a photographic film to be exposed in the camera. The cartridge 18 may include high speed film, for example, ASA 400 film, in which event the cartridge is provided with a relatively short rib 19 as illustrated in FIGS. 3 and 4 or it may contain a low speed film, for example, ASA 100 film, in which event it is provided with a relatively long rib 20 as illustrated in FIG. 5. The ribs 19 and 20 on the respective cartridges 18 provide structural means of a predetermined configuration in accordance with the speed of the film contained in the cartridge for automatically adapting the camera of this invention for the speed of the film utilized in the camera, as will be pointed out more particularly hereafter. The camera is provided with a knurled knob 21 for advancing the film in the cartridge 18 following exposure of the film therein. The upper portion of the camera 10 is provided with a viewfinder 23 which extends between the front and rear faces of the camera. The front face of the camera may also be provided with an electronic flash 24 which may be automatically extended laterally outwardly from the camera by manipulation of a button 25 on the front face of the camera as is common in cameras having electronic flash attachments. The camera mechanisms are generally contained in the lower portion of the camera frame 11 while the electronic and electrical mechanisms are contained in the upper portion thereof.

The camera of the preferred form of this invention contains an adjustable aperture mechanism 28, a manual control mechanism 29 movable between "sunny", "cloudy" and "flash" settings, and an automatic control mechanism 30 for adapting the camera for cartridges having respectively high and low speed films, as generally designated at 28, 29 and 30 in FIGS. 3 to 5. The adjustable aperture mechanism 28 is in alignment with the picture-taking axis 13 for regulating the amount of scene light exposing the film in the cartridge and is interposed between the lens 12 and the film in the cartridge ahead of the shutter mechanism 14. The manual control mechanism 29 is operatively associated with the adjustable aperture mechanism 28 and is movable between "sunny", "cloudy" and "flash" settings for adjusting the adjustable aperture mechanism to provide respectively "small", "intermediate" and "large" apertures for the scene light for high speed film in the cartridge 18. The automatic control mechanism 30 is operatively associated with the adjustable aperture mechanism 28 and includes a sensing member cooperating with the structural means 19 and 20 on the cartridge 18 received in the camera for adjusting the adjustable aperture mechanism 28 to increase the "small" aperture to the "intermediate" aperture and the "intermediate" aperture to the "large" aperture for low speed film without changing the settings of the manual control mechanism 29.

The adjustable aperture mechanism 28 is illustrated in more detail in FIGS. 4 to 6C. It includes a pair of relatively movable overlapping apertured plates 32 which are vertically slidable in guide slots 33 in the camera frame 11, the pair of plates 32 being provided with reversed apertures 34 therein. When the plates 32 are in the relative positions illustrated in FIG. 6A, the apertures 34 therein provide a "small" aperture 36 through the plates. When the plates 32 are in the relative positions indicated in FIG. 6B an "intermediate" aperture 37 is provided in the plates. When the plates 32 are in the relative position illustrated in FIG. 6C, a "large" aperture 38 is provided through the plates. The apertures 36, 37 and 38 through the plates 32 are symmetrical with the picture-taking axis 13 of the camera and operate to regulate the amount of scene light exposing the film in the cartridge 18.

To position relatively the plates 32, the plates are provided with reversely stepped slots 39 as shown more clearly in FIGS. 6A to 6C. A laterally movable link 40 is arranged in the slots so that when the link 40 is in the left hand position as illustrated in FIG. 6A, the "small" aperture 36 is provided.

When the link 40 is in an intermediate position as illustrated in FIG. 6B, an "intermediate" aperture 37 is provided. When the link 40 is in the right hand position as illustrated in FIG. 6C, the "large" aperture 38 is provided.

The link 40 forms a part of the adjustable aperture mechanism 28 and is provided at one end with a pivot hole 41 and at its other end with a pivot slot 42 which cooperate with pivot pins of the manual control mechanism 29 and of the automatic control mechanism 30 for appropriately laterally positioning the link 40 in the reversely stepped slots 39 in the apertured plates 32.

Figure 2:
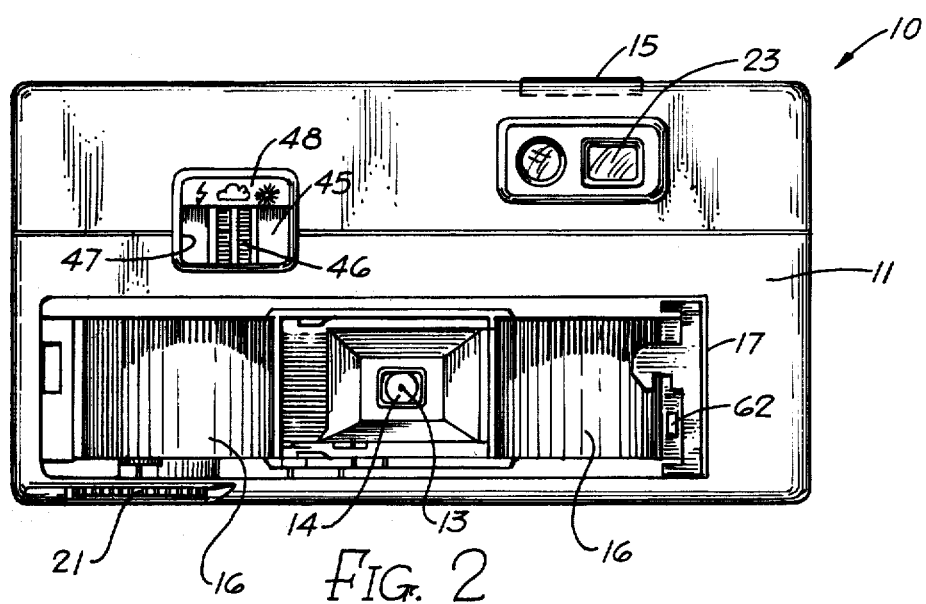
FIG. 2 is a rear elevational view of the camera with the camera set for "cloudy" conditions and with the rear door thereof open for the purpose of receiving a film cartridge therein.

The manual control mechanism 29 includes an elongated slide 45 having a knob 46 extending through a slot 47 in the rear face of the camera frame 11, the knob 46 being slidingly manipulatable from the exterior of the camera and having an indicator thereon cooperating with indicia 48 on the rear face of the camera indicating "sunny", "cloudy" and "flash". As illustrated in FIG. 2, the indicator is indicating the "cloudy" condition or setting. The slide 45 is guided for longitudinal movement by a pair of guides 49 and 50 on the frame within the camera. The guide 49 is provided with three longitudinally spaced grooves 49a, 49b and 49c. The slide 45 has a projection 51 which is received respectively in these grooves. When projection 51 is received in the groove 49a, the slide is in the "sunny" position or setting, when it is in the groove 49b, the slide is in the "cloudy" position or setting and when it is in the groove 49c, the slide is in the "flash" position or setting. As shown in FIG. 3, the slide is in the "cloudy" setting corresponding to FIG. 2 and, as shown in FIGS. 4 and 5, the slide is in the "sunny" setting.

The slide 45 of the manual control mechanism 29 is provided with an extension 53 which in turn is provided with a pair of downwardly extending pins 54 and 56. The pin 54 is slidable in a slot 55 in the camera frame 11 and the pin 56 is slidable in a slot 57 in the camera frame 11. The pins 54 and 56 cooperate with the slots 55 and 57 for longitudinally guiding the slide 45 in its longitudinal movement as well as the guides 49 and 50. The pin 56 in addition to sliding in the slot 57, extends through the pivot hole 41 in the link 40 of the adjustable aperture mechanism 28 so that as the slide 45 is longitudinally moved, the end of the link 40 pivoted thereto by the pivot pin 56 is laterally moved for laterally moving the link 40 in the reversely stepped slots 39 in the apertured plates 32.

The automatic control mechanism 30 includes a member 60, an arm 61 depending therefrom and a sensing member 62 which are guided for transverse movement in the camera frame. The arm 61 has a pin 64 thereon over which is received a spring 63 which operates to continually bias the member 60 toward the rear side of the camera 10 so as to project the sensing member 62 into the cavity which receives the cartridge 18 containing the film. The member 60 is provided with a diagonal slot 65.

The automatic control mechanism 30 also includes a member 67 which is guided for longitudinal movement by guide surfaces 68 in the camera frame. A slot 69 in the member 67 cooperating with a screw 70 secured in the camera frame 11 also operates to guide the member 67 in its longitudinal movement. One end of the longitudinally movable member 67 is provided with an upwardly extending pin 71 which is received in the slot 65 in the tranversely movable member 60 so that when the member 60 is moved toward the front of the camera, the slot 65 cooperating with the pin 71 moves the longitudinal member 67 from the left hand position illustrated in FIGS. 3 and 4 to the right hand position as illustrated in FIG. 5.

The longitudinally movable member 67 is provided with a downwardly extending pivot pin 72 which extends into the slot 42 in the link 40 of the adjustable aperture mechanism 28 and this pin 72 may further extend into a slot in the camera frame 11 for further guiding the longitudinal movement of the member 67. As the longitudinally movable member 67 is longitudinally moved between the position indicated in FIGS. 3 and 4 to the position indicated in FIG. 5, the link 40 is pivoted about the pivot pin 56 to laterally move the link 40 in the reversely stepped slots 39 in the pair of apertured plates 32. In this way, the automatic control mechanism 30 may also operate to control the adjustable aperture mechanism 28 to regulate the size of the aperture therethrough.

With the slide 45 of the manual control mechanism 29 in the "sunny" setting and with the longitudinally movable member 67 of the automatic control mechanism 30 in the left position as shown in FIG. 4, the link 40 is in the left end of the reversely stepped slots 39 so as to provide the "small" aperture 36 through the apertured plates 32. When a cartridge 18 containing a high speed film, which is characterized by the short rib 19 on the cartridge, is inserted in the camera the short rib 19 does not engage the sensing member 62 of the automatic control mechanism 30 so that the link 40 remains in the left end of the reversely stepped slots 39 to provide the small aperture 36 for exposure of the high speed film. However, if a cartridge 18 containing a low speed film, which is identified by the long rib 20 on the cartridge, is inserted in the camera, the long rib 20 engages the sensing member 62 of the automatic control mechanism 30 to cause the longitudinally movable member 67 to move to the right to move the link 40 to the mid position with respect to the reversely stepped slots 39 for providing an "intermediate" aperture 37 in the apertured plates 32 as illustrated in FIG. 5. Thus, the amount of scene light along the picture-taking axis 13 of the camera is increased to compensate for the use of low speed film in the camera instead of high speed film. In this way, the camera automatically adapts for use of either high speed or low speed film.

In a like manner, if the slide 45 of the manual control mechanism 29 were moved to the "cloudy" setting, as contemplated in FIGS. 2 and 3 the link 40 would be moved midway along the reversely stepped slots 39 in the overlapping apertured plates 32 to provide the "intermediate" aperture 37 through the apertured plates 32 as illustrated in FIG. 6B. If a high speed film were inserted in the camera, the short rib 19 on the cartridge 18 would not operate the automatic control mechanism 30 and the intermediate size aperture 37 would be retained for exposing the film under cloudy condition. However, if a low speed film were inserted in the camera, the long rib 20 on the cartridge 18 thereof would operate the automatic control mechanism 30 to move the link 40 to the right of the step slots 39 in the apertured plates 32 to provide the "large" aperture 38 therein for exposing the film under cloudy conditions.

Also, if the slide 45 of the manual control mechanism 29 were moved to the "flash" setting, the link 40 would be moved to the right end of the reversely stepped slots 39 as shown in FIG. 6C to provide the "large" aperture 38 therethrough and this would be true whether or not cartridges 18 having the high speed film and the short rib 19 or cartridges 18 having the low speed film and the long rib 20 were inserted in the film. For flash exposure the amount of scene light exposing the film is controlled principally by distance and not by aperture size.

If, as expressed above, the "cloudy" setting of the manual control mechanism 29 were omitted, as by omitting the groove 49b, the adjustable aperture mechanism 28 would be operated to provide the "small" aperture 36 as illustrated in FIG. 6A and the "large" aperture 38 as illustrated in FIG. 6C for "sunny" and "flash" settings. When a cartridge 18 having a low speed film is inserted in the camera, the small aperture 36 as shown in FIG. 6A would be increased in size to the "intermediate" aperture 37 as illustrated in FIG. 6B.

If, as expressed above, the manual control mechanism 29 were entirely eliminated to dispense with the "sunny", "cloudy" and "flash" settings, a stationary pivot pin would be provided for the pivot hole 41 in the link 40 which stationary pivot pin would have a position corresponding to the position of the pivot pin 56 of the manual control mechanism 29 when in its "sunny" setting. In this event, the adjustable aperture mechanism 28 would provide a small aperture for the high speed film corresponding to the aperture 36 illustrated in FIG. 6A. When a cartridge containing a low speed film is inserted in the camera, the automatic control mechanism 30 would operate to increase the size of the aperture to a size corresponding to the aperture 37 illustrated in FIG. 6B.

While for purposes of illustration, one preferred form of this invention has been disclosed herein, other forms thereof may become apparent to those skilled in the art upon reference to this disclosure and, therefore, this invention should be limited only by the scope of the appended claims.

I claim:

1. A camera having means for removably receiving a cartridge containing therein a relatively high speed or relatively low speed film and including structural means thereon of a predetermined configuration in accordance with the speed of the film contained therein, means for receiving scene light along a picture-taking axis for exposing the film in the cartridge, an adjustable aperture mechanism in alignment with the picture-taking axis for regulating the amount of scene light exposing the film in the cartridge, an aperture setting manual control member operable independently of the manually operable shutter operating means of the camera, said manual control member being immediately directly and continuously operatively connected with the adjustable aperture mechanism and movable sequentially between sunny, cloudy and flash indicating settings for adjusting the adjustable aperture mechanism to provide immediately respectively relatively small, intermediate and large size apertures in alignment with said picture-taking axis when said high speed film is in the camera, and an automatic control mechanism continuously operatively connected with the adjustable aperture mechanism and including a sensing member cooperating with the structural means on the cartridge received in the camer for adjusting the adjustable aperture mechanism to provide said small and intermediate apertures respectively in alignment with said picture-taking axis when said high speed film is in said camera and said manual control member has said sunny and cloudy indicating settings respectively and to increase the small aperture to the intermediate sized aperture and the intermediate sized aperture to the large aperture when said low speed film is in the camera without changing the settings of the manual control member.

2. A camera as defined in claim 1 wherein the adjustable aperture mechanism includes a link pivotally connected to the manual control member and to the automatic control mechanism and movable separately thereby.

3. A camera as defined in claim 1 wherein the adjustable aperture mechanism includes a pair of relatively movable overlapping apertured plates, the relative positions of which determine the size of the aperture therethrough, and which are relatively positioned by the manual control member and the automatic control mechanism.

4. A camera as defined in claim 1 wherein the adjustable aperture mechanism includes a pair of relatively movable overlapping apertured plates, the relative positions of which determine the size of the aperture therethrough, and a link pivotally connected to the manual control member and to the automatic control mechanism and movable thereby for relatively positioning the apertured plates.

5. A camera as defined in claim 4 wherein the adjustable aperture mechanism is provided with reversely stepped slots and the link is moved laterally in said slots for relatively positioning the mechanism.

6. A camera as defined in claim 5 wherein the link is connected at its ends to the manual control member and to the automatic control mechanism and engages the slots in said adjustable aperture mechanism intermediate its ends.

7. A camera as defined in claim 4 wherein the link is connected at its ends to the manual control member and to the automatic control mechanism.

8. A camera as defined in claim 1 wherein the manual control mechanism includes a longitudinally movable member moved in accordance with the settings thereof and having a pivot pin thereon, the automatic control mechanism also includes a longitudinally movable member moved by the sensing member and having a pivot pin thereon, and the adjustable aperture mechanism includes a link connected to the pivot pins on said longitudinally movable members and positioned in accordance with the respective longitudinal positions thereof, said adjustable aperture mechanism being positioned in accordance with the position of the link.

9. A camera as defined in claim 8 wherein the adjustable aperture mechanism is provided with reversely stepped slots and the link is moved laterally in said slots for relatively positioning the mechanism.

10. A camera having means for removably receiving a cartridge containing therein a relatively high speed or relatively low speed film and including structural means thereon of a predetermined configuration in accordance with the speed of the film contained therein, means for receiving scene light along a picture-taking axis for exposing the film in the cartridge, an adjustable aperture mechanism in alignment with the picture-taking axis for regulating the amount of scene light exposing the film in the cartridge, an aperture setting manual control member operable independently of the manually operable shutter operating means of the camera, said manual control member being continuously operatively connected with the adjustable aperture mechanism and immediately directly movable sequentially between ordinary light and flash indicating settings for adjusting the adjustable aperture mechanism to provide immediately relatively small and large apertures in alignment with said picture-taking axis when said high speed film is in the camera, and an automatic control mechanism continuously operatively connected with the adjustable aperture mechanism and including a sensing member cooperating with the structural means on the cartridge received in the camera for placing said relatively small aperture in alignment with said picture-taking axis when said high speed film is in said camera and said manual control member has said first setting and for adjusting the adjustable aperture mechanism to provide said relatively large aperture in alignment with said picture taking axis when low speed film is in said camera and said manual control member has said first setting.

11. A camera as defined in claim 10 wherein the automatic control mechanism also includes a longitudinally movable member moved by the sensing member and having a pivot pin thereon, and the adjustable aperture mechanism includes a link connected to the pivot pin on said longitudinally movable member and positioned in accordance with the longitudinal position thereof.

12. A camera as defined in claim 11 wherein the adjustable aperture mechanism is provided with reversely stepped slots and the link is moved laterally in said slots for relatively positioning the mechanism.

13. A camera having means for removably receiving a cartridge containing therein a relatively high speed or relatively low speed film and including structural means thereon of a predetermined configuration in accordance with the speed of the film containing therein, means for receiving scene light along a picture-taking axis for exposing the film in the cartridge, an adjustable aperture mechanism in alignment with the picture-taking axis for regulating the amount of scene light exposing the film in the cartridge, an aperture setting manual control member operable independently of the manually operable shutter operating means of the camera, said manual control member being continuously operatively connected with the adjustable aperture mechanism and immediately directly movable sequentially between first and second settings for adjusting the adjustable aperture mechanism to provide immediately respectively relatively small and relatively large apertures in alignment with said picture-taking axis when said high speed film is in the camera, and an automatic control mechanism continuously operatively connected with the adjustable aperture mechanism and including a sensing member cooperating with the structural means on the cartridge received in the camera for placing said relatively small aperture in alignment with said picture-taking axis when said high speed film is in said camera and said manual control member has said first setting and for adjusting the adjustable aperture mechanism to provide said relatively large aperture in alignment with said picture-taking axis when low speed film is in said camera and said manual control member has said first setting.

14. A camera as defined in claim 13 wherein the adjustable aperture mechanism includes a link pivotally connected to the manual control mechanism and to the automatic control mechanism and movable thereby.

15. A camera as defined in claim 13 wherein the adjustable aperture mechanism includes a pair of relatively movable overlapping apertured plates, the relative positions of which determine the size of the aperture therethrough, and which are relatively positioned by the manual control member and the automatic control mechanism.

16. A camera as defined in claim 13 wherein the adjustable aperture mechanism includes a pair of relatively movable overlapping apertured plates, the relative positions of which determine the size of the aperture therethrough, and a link pivotally connected to the manual control member and to the automatic control mechanism and movable thereby for relatively positioning the apertured plates.

17. A camera as defined in claim 13 wherein the adjustable aperture mechanism is provided with reversely stepped slots and the link is moved laterally in said slots for relatively positioning the mechanism.

18. A camera as defined in claim 17 wherein the link is connected at its ends to the manual control member and to the automatic control mechanism and engages the slots in the apertured plates intermediate its ends.

19. A camera as defined in claim 13 wherein the manual control member includes a longitudinally movable member moved in accordance with the settings thereof and having a pivot pin thereon, the automatic control mechanism also includes a longitudinally movable member moved by the sensing member and having a pivot pin thereon, and the adjustable aperture mechanism includes a link connected to the pivot pins on said longitudinally movable members and positioned in accordance with the respective longitudinal positions thereof, said adjustable aperture mechanism being positioned in accordance with the position of the link.

20. A camera as defined in claim 19 wherein the adjustable aperture mechanism is provided with reversely stepped slots and the link is moved laterally in said slots for reiatively positioning the mechanism.

* * * * *